(12) United States Patent
Kimber et al.

(10) Patent No.: US 6,377,717 B1
(45) Date of Patent: Apr. 23, 2002

(54) OPTICAL MODULATORS

(75) Inventors: Eric Mark Kimber, Paignton; Davide Frassati, Torquay, both of (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/679,165

(22) Filed: Oct. 4, 2000

(51) Int. Cl.[7] .............................................. G02G 1/035
(52) U.S. Cl. ..................... 385/2; 385/1; 385/3; 359/245
(58) Field of Search ................................ 385/1, 2, 3, 4, 385/5, 6, 7, 8, 40, 16, 9; 359/237, 245, 246, 322, 278, 279

(56) References Cited

U.S. PATENT DOCUMENTS

| | | | |
|---|---|---|---|
| 4,288,785 A | * 9/1981 | Papuchon et al. | 341/111 |
| 5,199,086 A | * 3/1993 | Johnson et al. | 385/2 |
| 5,566,257 A | * 10/1996 | Jaeger et al. | 385/2 |
| 5,799,116 A | * 8/1998 | Yamamoto | 385/2 |
| 6,002,816 A | * 12/1999 | Penninckx et al. | 385/3 |

* cited by examiner

Primary Examiner—Georgia Epps
Assistant Examiner—Tuyen Tra
(74) Attorney, Agent, or Firm—Lee, Mann, Smith, McWilliams, Sweeney & Ohlson

(57) ABSTRACT

The optical modulator comprising an optical input signal waveguide, first and second interferometric waveguide arms, a modulated output signal waveguide, a splitter for dividing the input signal between the first and second arms, and a combiner for recombining the signals, transmitted along each of the first and second arms into the output signal waveguide. The first and second electrodes each of a segmented structure having a plurality of elements each extending from a respective one of the first and second electrodes and each terminating at position adjacent a length of corresponding one of the first and second arms wherein only a proportion of the elements terminate at positions such as to have an electro-optic effect on a signal transmitted through the corresponding one of the arms. Thus, only proportion of the elements are in active in the sense that only they induce a phase shift in the signal transmitted through the respective one of the arms.

9 Claims, 2 Drawing Sheets

OPTICAL MODULATORS

FIELD OF THE INVENTION

The invention relates to optical modulators and in particular to modulators having the capability to introduce an amount of chirp into a modulated output signal.

BACKGROUND OF THE INVENTION

Optical modulators are extensively used in optical communications networks. At the modulator, an input optical signal from a suitable source, for instance, a semiconductor laser diode, may be modulated according to an electrical signal to produce an optical data signal for transmission over the network. Semiconductor Mach-Zehnder modulators are especially suitable for producing high bit rate modulated optical data signals for optical networks.

Mach-Zehnder modulators typically comprise a splitter for dividing an incoming optical signal on an input waveguide equally between two interferometric waveguide arms. Each arm is located within an electrode structure to which an RF signal is applied. Downstream of the arms is a suitable combiner for re-combining each of the signals transmitted through the arms into a single modulated output signal. Mach-Zehnder modulators may be fabricated in gallium arsenide with aluminum gallium arsenide for the waveguide regions.

The electrode structure of a Mach-Zehnder modulator is so arranged that the RF signal applied thereto has an electro optic effect on the two interferometric arms. As a result, a phase shift may be induced in the signals transmitted through the arms. According to the manner of handling the RF signal, for instance in a push-pull mode, the relative phase shifts induced in the signals in each of the arms can be sure as to produce either constructive or destructive interference on re-combination. For example, if no voltage is applied to the electrode structure, no phase shift is induced in the signals passing through either of the arms and the signals will interfere constructively on recombining to provide a "1" or ON output. On the other hand, if the voltage is so applied as to induce a relative 180° phase shift between the two signals, destructive interference occurs on re-combination, which will dictate a "0" or OFF output. Hence, phase shift may be manipulated to produce an amplitude modulated output.

The electrode structure of a Mach-Zehnder modulator may be of a so-called lumped element type wherein an RF signal is applied to a single electrode which interacts electro optically with the two interferometric arms. It is also known to use electrodes termed segmented element electrodes wherein an electrode or one electrode for each arm is segmented into a number of elements, each extending from a respective location along the electrode and sampling the voltage at that location. Typically, there will be of the order of 20–200 elements per electrode. Each element terminates at a position adjacent to a corresponding one of the arms, at or over it, so as to electro optically interact with a length of the corresponding arm. The interaction between each element and the length of the corresponding arm induces a phase shift in the signal transmitted through it. The total phase shift induced in the signal is the sum of the phase shifts contributed by each of the elements. Each element behaves as a capacitor, and the total capacitance presented to the RF signal is the sum of the individual capacitance contribution from each element. In a balanced "chirp free" dual electrode modulator, each electrode may be segmented into an equal number of elements extending from correspondingly the same locations along each electrode and such that the elements contribute a periodical, symmetrical capacitance structure to the electrodes. The two electrodes may be back connected to provide a series push-pull configuration, and because of the periodical structure the RF signal is split equally in magnitude between the two electrodes.

Chirp is the term given to an amount of phase shift in a signal. In optical networks, the transmission of optical data signals over long distances, which is desirable, to minimise the requirements for further processing, may be limited by effects such as dispersion. It is known that introducing chirp is effective in compensating for dispersion in long haul optical signals.

Various Mach-Zehnder modulators have been proposed, which include the capability to dictate an amount of chirp in the modulated output signal for the purpose of overcoming such limitations as dispersion.

OBJECT OF THE INVENTION

The object of the invention is to provide an optical modulator with the capability to introduce an amount of chirp into the modulated output signal without attracting undesirable effects.

SUMMARY OF THE INVENTION

The invention provides an optical modulator comprising an optical input signal waveguide, first and second interferometric waveguide arms, a modulated output signal waveguide, a splitter for dividing the input optical signal between the first and second arms, a combiner for re-combining the signals transmitted along each of the first and second arms into the output signal waveguide, first and second electrodes each of a segmented structure having plurality of elements each extending from a respective one of the first and second electrodes and each terminating at a position adjacent a length of a corresponding one of the first and second arms, wherein only a proportion of the elements terminate at positions such as to have an electro optic effect on a signal transmitted through the corresponding one of the first and second arms. Thus, only a proportion of the elements are active in the sense that only they may induce a phase shift in the signal transmitted through the respective one of the arms. Preferably, they terminate at or over the corresponding one of the arms. The remaining elements are passive and produce no phase shift effects. Preferably, they terminate alongside the arms. The capability to introduce chirp is by virtue of a differential between the number of active elements in one electrode and the number of active elements in the other. Such a differential gives rise in the modulated output signal to a phase shift imbalance and hence chirp. Whilst the passive elements have no electro optic effect on which ever of the arms they are adjacent, their positioning is such that they still behave as capacitors. Consequently, if the total number of active and passive elements in each electrode is same and because each contributes to capacitance, the electrodes have a smooth periodical structure. Accordingly, any imbalance other than that to the resultant phase shift, such as to the periodical structure, which could result in undesirable effects, is avoided. In other words, in terms of the loading presented to the RF signal, the modulator according to the invention behaves in the same way as a balanced, "chirp free" modulator.

The amount of chirp is dictated by the quantity of the differential, or the ratio, of active elements in one electrode to active elements in the other electrode. Preferably, all of the elements in one electrode are active and the amount of chirp is dictated by the number of active elements in the other electrode.

The modulator may be provided with at least one dummy waveguide and the passive elements may terminate adjacent the dummy waveguide. A dummy waveguide may be provided for each electrode and the passive elements of each electrode may terminate adjacent the corresponding waveguide. The dummy waveguide could alternatively be a land or island or any other similar entity which may serve the function of a dummy waveguide, and which results in the adjacent elements behaving as capacitors.

DETAIL DESCRIPTION OF THE INVENTION

Figure 1:
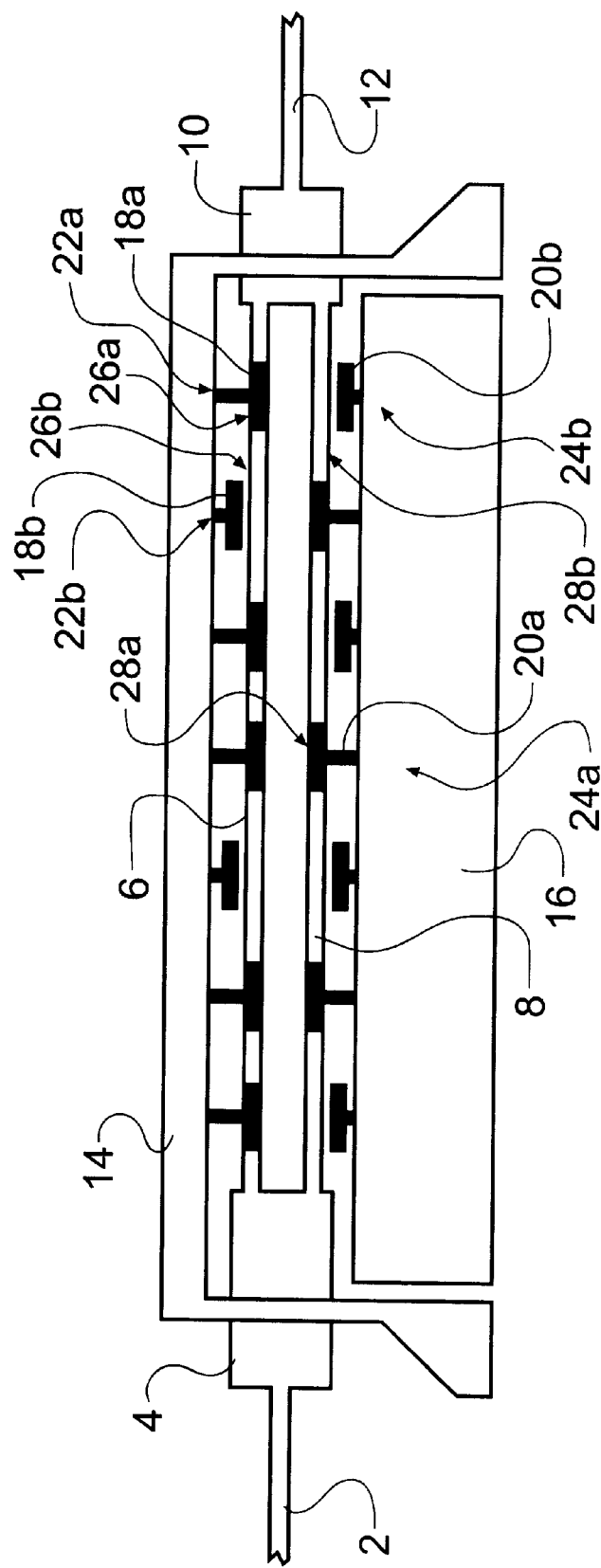
FIG. 1 is a schematic plan view of the basic layout of an optical modulator according to the invention.

With reference to FIG. 1, a modulator according to the invention indicated generally at 1 has an input optical waveguide 2 through which an optical signal from a laser diode source (not shown) is fed to a waveguide splitter 4. The input signal is divided by the splitter 4 between each of the first and second interferometric waveguide arms 6, 8 respectively. The divided signals transmitted through each of the arms 6, 8 respectively are re-combined at combiner 10 to provide a modulated output signal on an output optical waveguide 12.

Each of the first and second interferometric waveguide arms 6, 8 has associated with it first and second electrodes 14, 16 respectively. Each of the first and second electrodes 14, 16 is capable of producing a phase shift in the signal transmitted along the corresponding arm 6, 8 respectively: The phase shifts produced by each of the electrodes 14, 16 are not equal and opposite so that there is a residual phase shift when the two signals are re-combined at the combiner 10.

Each electrode 14, 16 is segmented into a plurality elements 18, 20 each of which extends transversely from its own location 22, 24 along the respectively corresponding one of the first and second electrodes 14, 16 and terminates adjacent a length 26, 28 of the associated one of the arms 14, 16 respectively. Each element 18, 20 behaves as a capacitor and the total capacitance presented to the RF signal carried by each electrode 14, 16 is the sum of the individual capacitances of each element 18, 20. The segmented structure is symmetrical such that each electrode 14, 16 has the same number of elements 18, 20 at correspondingly the same longitudinal positions along the other electrode 16, 14. Consequently, the elements 18 contribute to a periodical, symmetrical capacitance structure which is presented to the RF signal in each electrode 14, 16.

Figure 2:
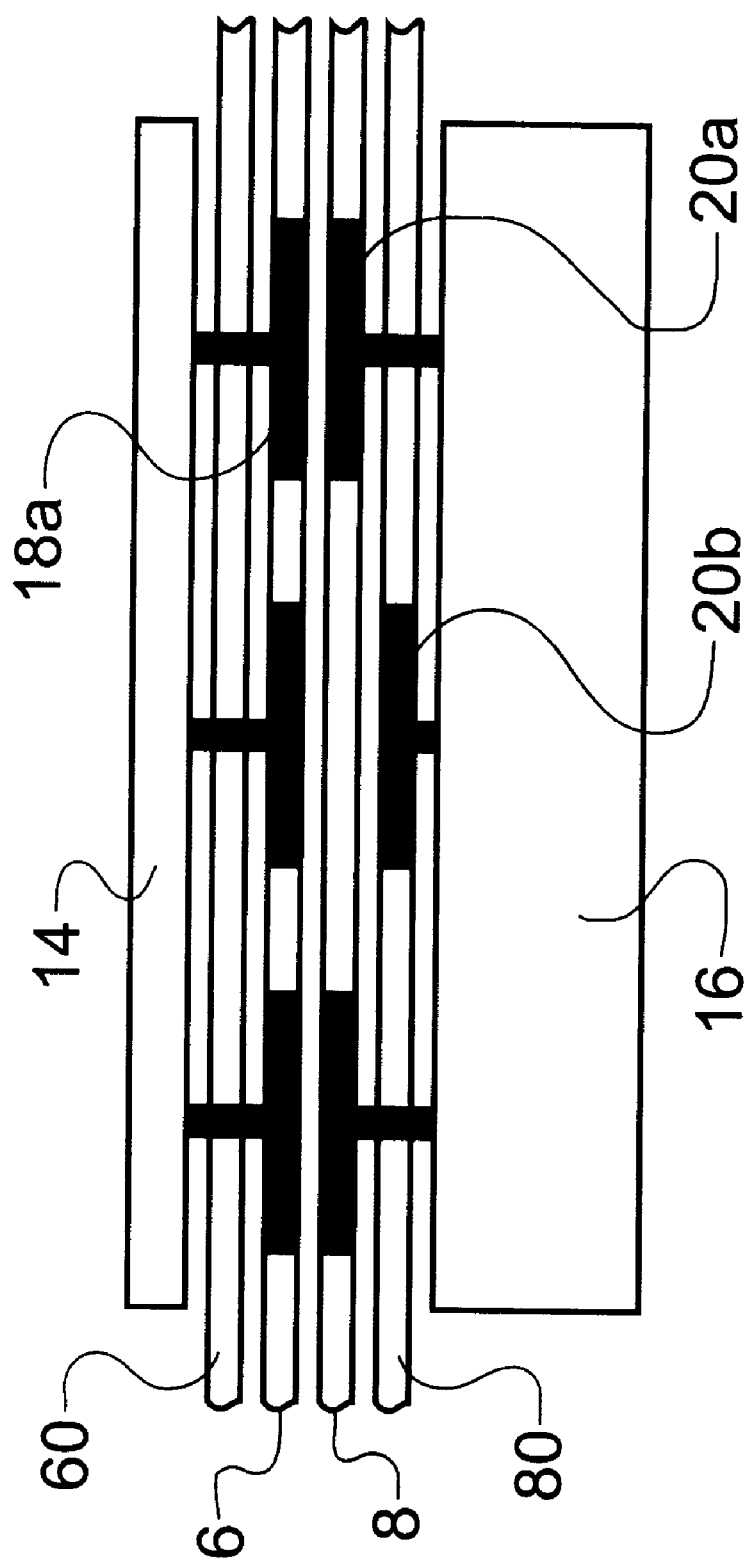
FIG. 2 is a schematic plan view of the basic layout of an optical modulator according to an alternative embodiment of the invention.

A proportion of the elements, the "active elements" 18a, 20a in each electrode 14, 16 respectively terminate at or over the corresponding arm 6, 8. This termination positioning dictates that the active elements will have an electro optical effect upon the signal transmitted through the corresponding arm 6, 8. The electro optic effect which these active elements 18a, 20a have results in a phase shift in the signal in each of the arms 6, 8. The total phase shift in the signal downstream of each arm 6, 8, at the combiner 10, is the result of the sum of the individual phase shifts contributed by each of the active elements 18a, 20a adjacent the corresponding arm. The remainder of the elements 18b, 20b, the "passive" elements, are terminated at a position alongside each of the corresponding first and second arms 6, 8. Such a termination position dictates that they will have no electro optic effect on the arm 8. On the other hand, the passive elements 18b, 20b terminates on position is such that they still behave as capacitors, presenting a capacitance to the RF signal applied to the electrodes 14, 16. A differential between the number of active elements in the first electrode and the number of active elements in the second electrode will result in a phase shift imbalance and hence chirp in the modulated data output signal on output waveguide 12. Consequently, the modulator according to the invention provides an amount of chirp which can be utilised in optical networks to compensate for dispersion effects. Furthermore, although the sum of the elements 18 may be electro optically ineffectual, their presence continues to contribute to the overall capacitance presented to the RF signal, so that while there may be a phase shift imbalance in the electrodes 6, 8 there is no capacitance imbalance and electrodes 14, 16 have a periodical, symmetrical capacitance structure With reference to FIG. 2, an alternative embodiment of a modulator 1 is provided with a dummy, non-transmitting interferometric arm, 80 at which the passive elements 18 are terminated thereby to maintain the periodical structure of the electrodes 14, 16. Another dummy waveguide 60 is also provided so as to balance the structure.

What is claimed is:

1. An optical modulator comprising an optical input signal waveguide, first and second interferometric waveguide arms, a modulated output signal waveguide, a splitter for dividing the input optical signal between the first and second arms, a combiner for re-combining the signals transmitted along each of the first and second arms into the output signal waveguide, first and second electrodes each of a segmented structure having a plurality of elements each extending from a respective one of the first and second electrodes and each terminating at a position adjacent a length of a corresponding one of the first and second arms, wherein only a proportion of the elements terminate at positions such as to have an electro optic effect on a signal transmitted through the corresponding one of the first and second arms.

2. An optical modulator according to claim 1 wherein the proportion of elements which have an electro optic effect terminate at or over the corresponding one of the arms.

3. An optical modulator according to claim 1 wherein the elements which have an electro optic effect terminate alongside the corresponding one of the arms.

4. An electro optic modulator according to claim 1 wherein the amount of chirp in the output modulated signal is dictated by the differential between the number of elements in the first electrode having an electro optic effect and the number of elements in the second electrode having an electro optic effect.

5. An optical modulator according to claim 1 wherein the elements which have no electro optic effect behave as capacitors.

6. An optical modulator according to claim 5 wherein the total number of elements in each of the first and second electrodes is the same.

7. An optical modulator according to claim 1 wherein all of the elements in one of the first and second electrodes have an electro optic effect.

8. An optical modulator according to claim 1 provided with at least one dummy waveguide and wherein the elements not having an electro optic effect terminate adjacent the dummy waveguide.

9. An optical modulator according to claim 8 wherein a dummy waveguide is provided for each of the first and second electrodes and the elements not having an electro optic effect in each electrode terminate adjacent the corresponding dummy waveguide.

* * * * *